M. ROBINSON, dec'd. Susannah Robinson, Adm'x.
Machines for Shaping the Elastic Dents of Combs for Looms.
No. 135,444. Patented Feb. 4, 1873.

6 Sheets--Sheet 2.

M. ROBINSON, dec'd. Susannah Robinson, Adm'x.
Machines for Shaping the Elastic Dents of Combs for Looms.
No. 135,444. Patented Feb. 4, 1873.

6 Sheets--Sheet 3.

Witnessed by
William Robertson.
John James Royle.

Susannah Robinson

M. ROBINSON, dec'd. Susannah Robinson, Adm'x.
Machines for Shaping the Elastic Dents of Combs for Looms.
No. 135,444. Patented Feb. 4, 1873.
6 Sheets--Sheet 5.
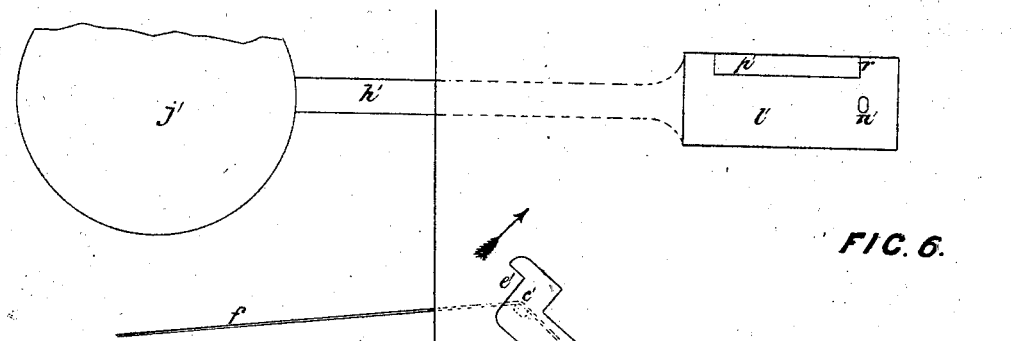
FIG. 6.
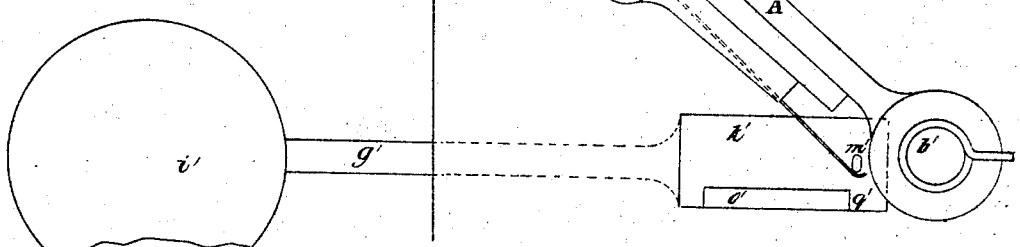
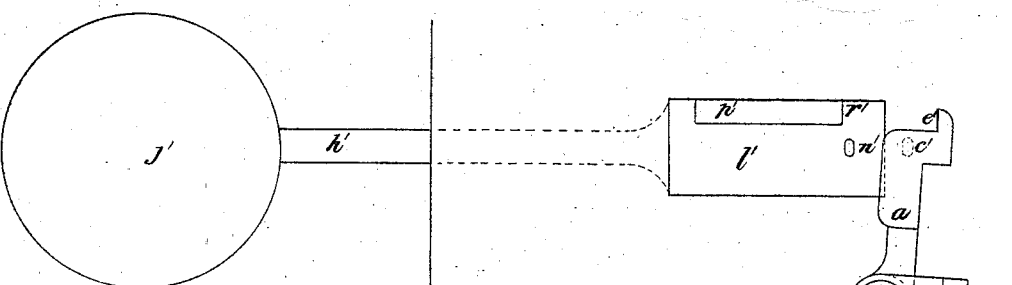
FIG. 7.
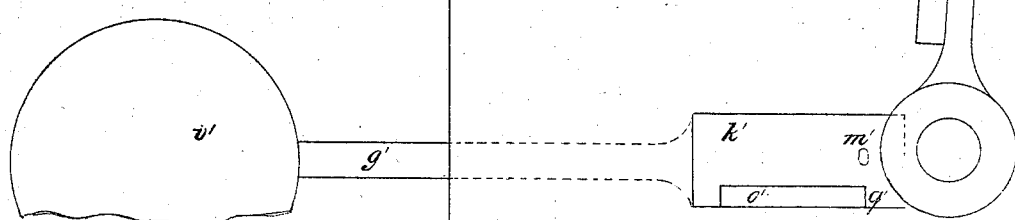

M. ROBINSON, dec'd.
Susannah Robinson, Adm'x.
Machines for Shaping the Elastic Dents of Combs for Looms.
No. 135,444.
Patented Feb. 4, 1873.

UNITED STATES PATENT OFFICE.

SUSANNAH ROBINSON, OF ACCRINGTON, ENGLAND, ADMINISTRATRIX OF MATTHEW ROBINSON, DECEASED.

IMPROVEMENT IN MACHINES FOR SHAPING THE ELASTIC DENTS OF COMBS FOR LOOMS.

Specification forming part of Letters Patent No. 135,444, dated February 4, 1873.

*To all whom it may concern:*

Be it known that MATTHEW ROBINSON, deceased, of Accrington, Lancaster county, England, did invent certain Improvements in Machinery for Shaping the Elastic Dents of Expanding and Contracting Combs, of which the following is a specification:

The following is a description of the machine or improvements in machinery for shaping the elastic dents of expanding and contracting combs, left by MATTHEW ROBINSON at his death:

The wire is placed on the ordinary reel; but, instead of bending or shaping it and nipping by hand, I cause those operations to be performed by means of the following machinery or apparatus, which will be clearly understood by the following detailed description thereof, reference being had to the figures and letters on the accompanying six sheets of drawing, in which—

Figure 1:
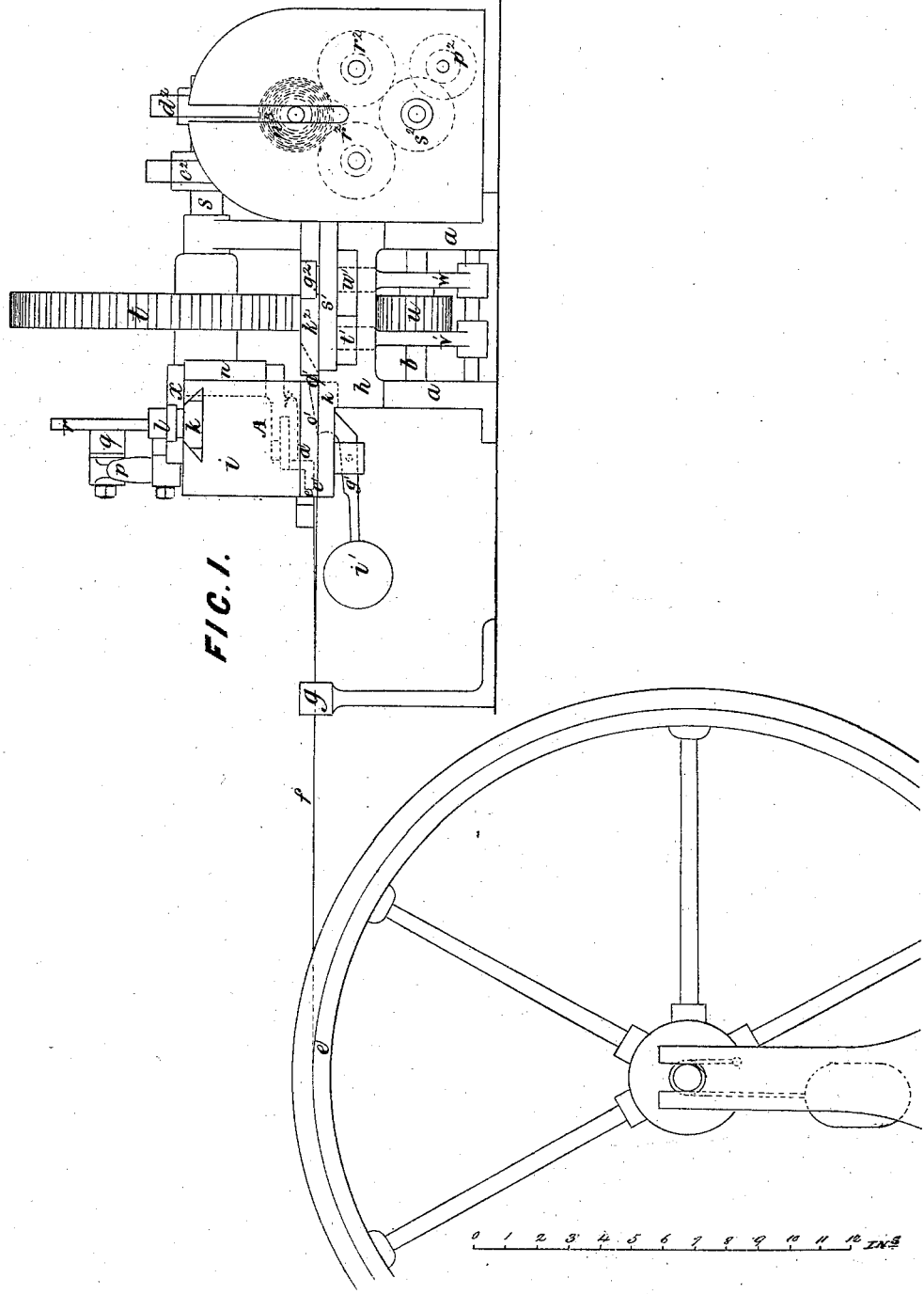
Figure 2:
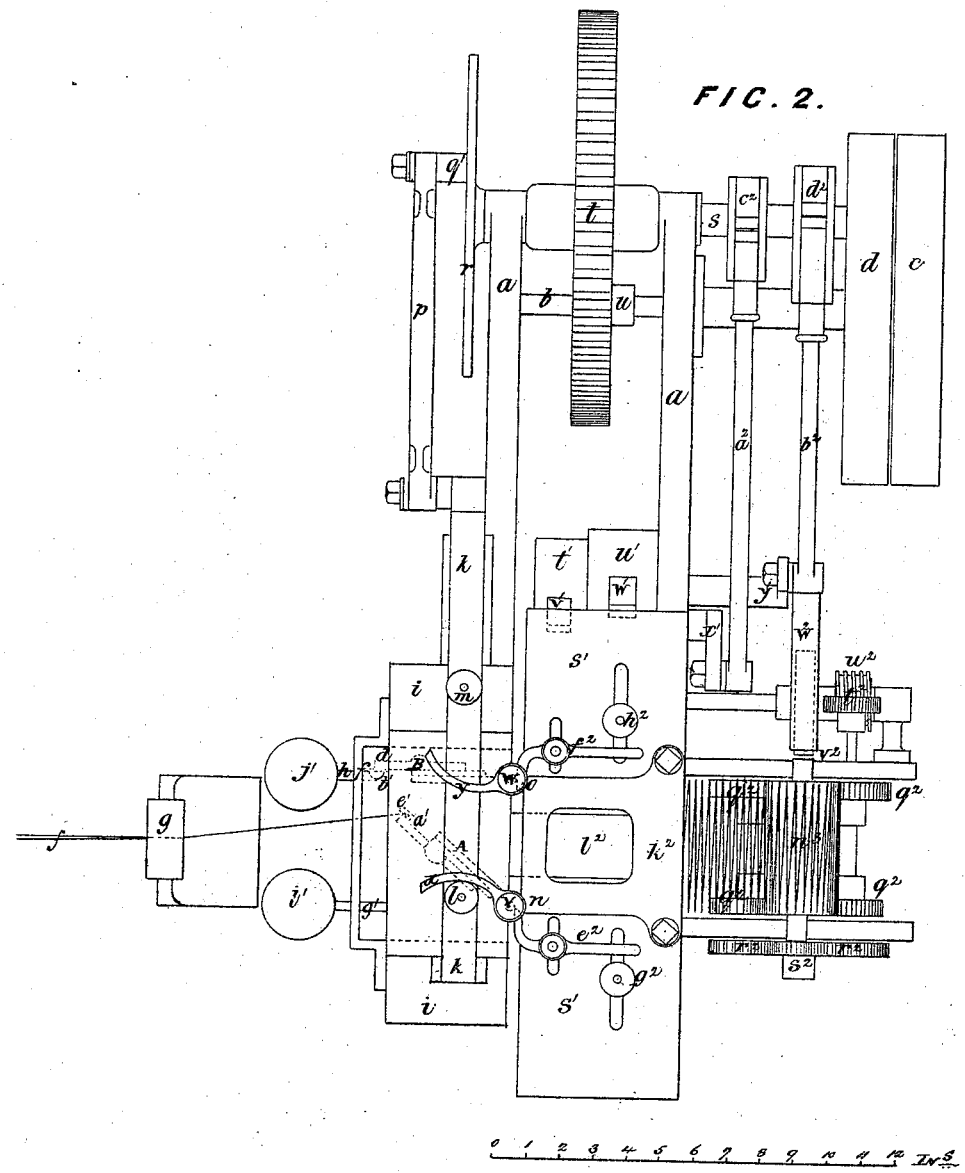
Figure 3:
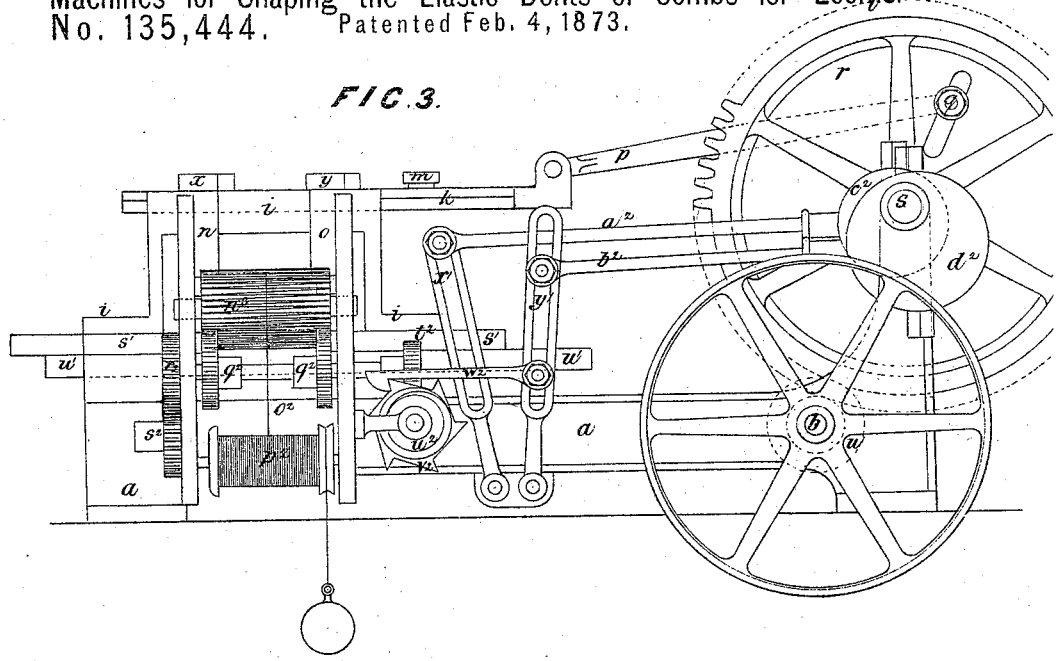
Figure 4:
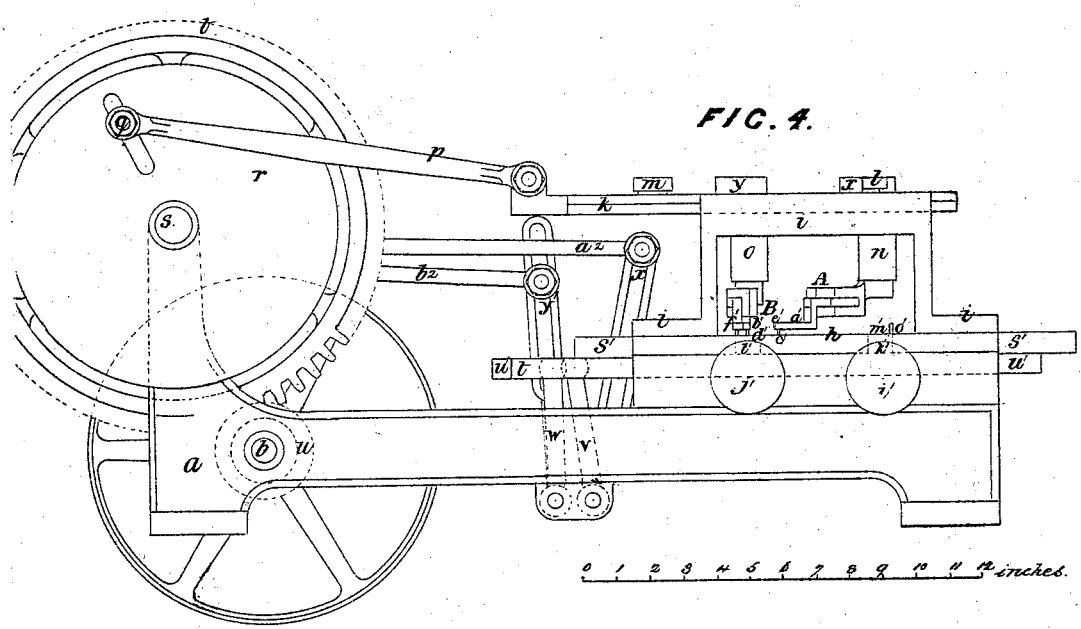
Figure 5:
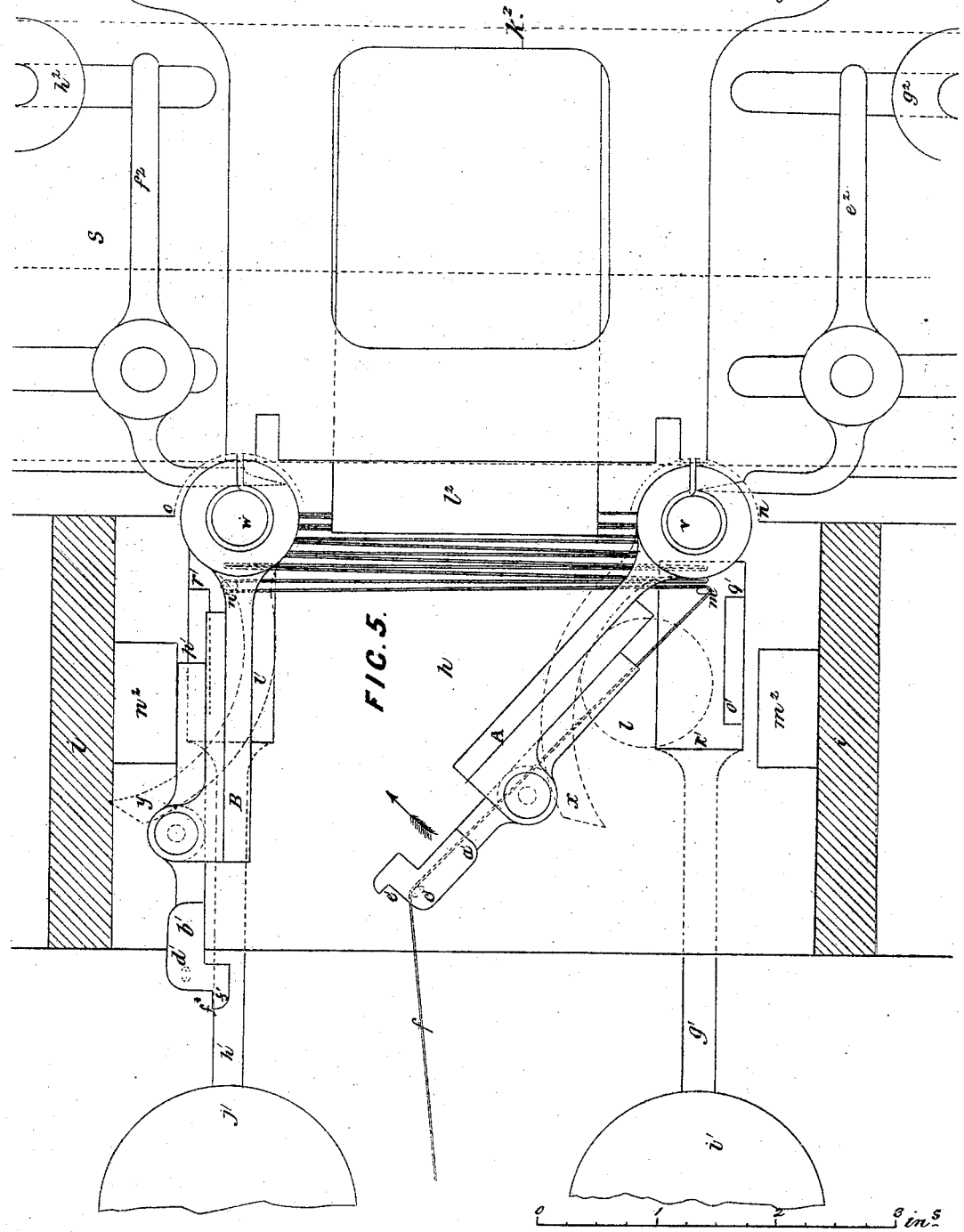
Figure 8:
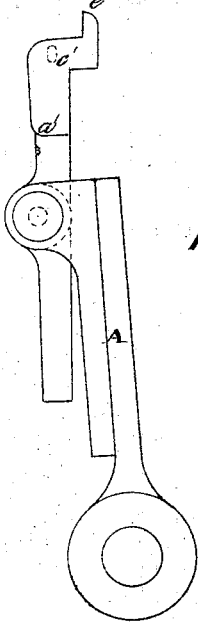
Figure 9:
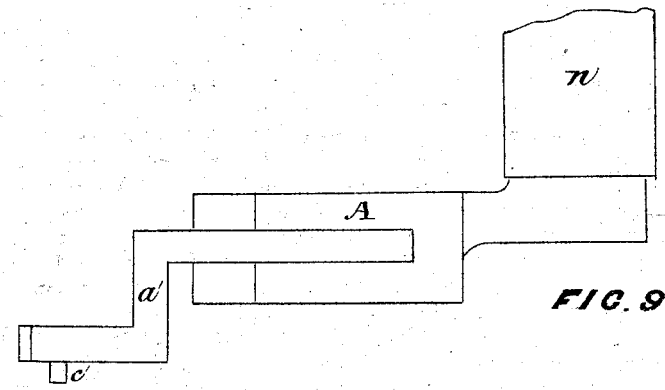

Figure 1 is a front elevation, Fig. 2 a plan, and Figs. 3 and 4 side elevations, of the improved machinery for shaping the elastic dents of expanding and contracting combs; and Figs. 5, 6, 7, 8, and 9 are enlarged views of some of the parts.

In Figs. 1, 2, 3, and 4, $a$ represents the frame-work of the machine; $b$, the driving-shaft; $c\ d$, the fast and loose pulleys; and $e$, the ordinary reel containing the wire of which the combs are to be made. The said frame-work $a$ is fixed on a bench, or on standards, or on a frame-work of wood or metal, as may be desired; and the wire marked $f$ passes from the reel to the guide $g$, which prevents it from twisting or buckling, and then to a table, $h$, fixed to the frame-work $a$, on which table there is a small frame, $i$, having at the top a slide, $k$, carrying two bowls, $l\ m$, and at one side two vertical bearings and boxes, $n\ o$. The slide $k$ is connected, by the connecting-rod $p$, to the crank $q$ bolted to the plate-wheel $r$ fixed to the second motion-shaft $s$, carrying the toothed wheel $t$ gearing into the pinion $u$ on the driving-shaft $b$. In the vertical bearings there are spindles $v\ w$ encircled by spiral springs contained in the boxes, one end of each spring being connected to the spindle and the other end to the box. On the upper ends of the spindles are fixed arms or levers $x\ y$, and on their lower ends levers A B, to which are jointed arms $a^1\ b^1$, having at their outer extremities pins $c^1\ d^1$ and projections $e^1\ f^1$, as shown, enlarged in plan, in Figs. 5, 6, 7, and 8, and in elevation in Fig. 9. On studs fixed to the table $h$ there are two levers, $g^1$ and $h^1$, having at one end weights $i'$ and $j'$ and at the other end plates $k^1$ and $l^1$; also, pins $m^1$ and $n^1$, inclines $o^1$ and $p^1$, the upright ends $q^1\ r^1$. At the sides of the table $h$, and at the same level, there is another table, $s^1$, below which there are two slides, $t'$ and $u^1$, having slots inclosing the tops of the levers $v^1$ and $w^1$, Figs. 1, 2, and 4, attached to shafts, on the outer ends of which are fixed other levers, $x'\ y'$, connected, by the rods $a^2\ b^2$, to the eccentrics $c^2\ d^2$. To the slide $t$ are fixed studs, which pass through slots in the table $s^1$, and carry nipping-levers $e^2\ f^2$ sharpened at the point somewhat, (see Fig. 5;) and to the slide $u^1$ are fixed studs which pass through slots in the same table $s^1$, and carry bowls $g^2\ h^2$; and above the table, at any required distance, according to the width or depth of the comb, there is a plate, $k^2$, and spring-plate $l^2$ for keeping the dents steady as they move onward.

When the driving-strap is on the fast pulley the pinion $u$ turns the wheel $t$, shaft $b$, plate-wheel $r$, and crank $q$, thereby giving, by means of the connecting-rod $p$, a reciprocating motion to the slide $k$ and bowls $l$ and $m$, which thus act alternately on the upper arms $x$ and $y$ and move them, and also the lower levers A and B and arms $a^1\ b^1$, arcs of a circle, and the spiral springs in the boxes $n\ o$ move them back to their original positions. The lower levers and arms are employed for bending or shaping the wire to form the dents of the comb, and the length of the arcs their extremities describe correspond with the required length of the dents, the said levers and arms being moved alternately in opposite directions—one set employed for forming the bends at one end of the dents and the other set the bends at the other ends of the dents.

The operation of one of the lower levers and arms is as follows; and it is to be understood that both levers and arms are exactly alike in construction and operation: When the lower lever and arm A and $a^1$ are turned inward in the direction of the arrows (see Figs. 5 and 6) the pin $c^1$ on the arm $a^1$ seizes the wire $f$ and bends it, and, as the arm proceeds, its under end comes in contact with the incline $p^1$ and presses it down, and with it the plate $l^1$ and pin $n^1$, beyond which the pin $c^1$ and wire $f$ pass, and when the extreme end of the arm has passed the incline the weight $j'$ raises the incline and plate and places the pin $n^1$ before the pin $c^1$, as shown in Fig. 7, which pin $n^1$ holds the wire when the pin $c^1$ on the arm is moving away from the said pin $n^1$. As the driving-shaft $b$ revolves the movement of the slide $k$ is reversed, the bowl $i$ leaving the upper arm $x$ and lower lever and arm A and $a^1$ free to be turned back by the spring in the box $n$, and shortly after the said lower lever and arm commence their return movement. The pin $c^1$ comes in contact with the pin $n^1$, the resistance of which causes the arm to turn at its joint, and thereby shorten it, so that the pin $c^1$ passes the pin $n^1$ and the projection $e^1$ clears the upright end $r^1$ of the incline $p^1$, and when the lever and arm arrive at their original starting positions the arm presses against the projection $m^2$ (see Fig. 5) fixed to the frame $i$ and straightens the lever and arm, which then wait until they have again to move forward to make another bend; and it will be seen that there is another projection, $n^2$, on the other side of the frame $i$, for straightening the lever and arm B and $b^1$. As the slide $k$ continues to move the bowl $m$ turns the upper arm $y$ and lower lever and arm B and $b^1$, and operations precisely similar to those just described take place, forming the other end of the dent. During the foregoing movements the two slides $t'$ and $u^1$ are moving to and fro by means of the eccentrics $c^2$ and $d^2$, and as the wire after its seizure by either pin $c^1$ and $d^1$ is being carried forward to be held by its corresponding pin on one of the plates $k^1$ $l^1$ the ends of the nipping-levers $f^2$ and $l^2$ on their respective sides are moved between the ends of the dents on such side and just before or at the same instant that the pin $l^1$ (Fig. 6, for example) on the arm A arrives at its most forward position. The bowl $h^2$ on one side acts upon the arm $f^2$ of the nipper on the same side and forces the nipping end toward the pin on the arm of the lever A, the effect of which is that as the nipper and pin approach each other the two parts of the wire constituting that end of the dent are squeezed closely together in a very effectual manner. By the reciprocating action of the eccentrics the bowl $h^2$ now moves away from the nipper-lever $f^2$, and at the same time the nipper itself recedes from the dents at that end. Similar operations take place at the other end of the dents when the bend last made has to be squeezed. The dents as they are formed pass onward between the table $s^1$ and spring-plate $l^2$ and are connected to the taking-up drum $n^3$, (see Figs. 1, 2, and 3,) to which at the same time is attached one end of the cord $o^2$ from the bobbin $p^2$, the same cord winding on with the comb, and preventing any entanglement of the dents. The drum first, and then the comb as it is wound on the drum, rests on the disks $q^2$, Figs. 1, 2, and 3, the shafts of which carry toothed wheels $r^2$, both gearing into an intermediate wheel, $s^2$, and to one of the shafts is fixed the worm-wheel $l^2$, gearing into the worm $u^2$, on the shaft of which there is a ratchet-wheel, $v^2$, worked by a catch or ratchet, $w^2$, jointed to the lever $y'$, and as the disks are continuously revolving at the same speed their surfaces wind on the comb as it increases in diameter on the drum at a uniform speed.

It is evident that instead of winding the comb on a drum the dents may slide down a trough placed to receive them as they are formed, and also that by connecting toothed or worm gearing with the second shaft $s$ driven from the driving-shaft $b$, and employing a dial-plate and finger, the number of dents formed in the machine may be indicated.

For preventing the reel $e$ containing the wire from overrunning, I employ a brake-strap, $v^2$, on the shaft of the reel; or I place between the reel and the table one or more rollers and weights for maintaining the proper tension of the wire, and, when desired, I cause the reel to work horizontally on a vertical shaft or stud.

Having now described the nature and particulars of the invention, and the manner in which the same is to be performed, as left by my deceased husband, I wish it to be understood that I claim as secured thereby—

The levers A and B carrying the arms $a^1$ and $b^1$, in conjunction with the nipping-levers $e^2$ and $f^2$, when mounted and operated substantially as and for the purpose described.

SUSANNAH ROBINSON.

Witnesses:
 WILLIAM ROBERTSON,
 JOHN JAMES ROYLE.